United States Patent Office 3,511,846
Patented May 12, 1970

3,511,846
PROCESS FOR THE PREPARATION OF OPTICALLY ACTIVE BENZAZOCINES
Walter F. Munch, Jr., Dobbs Ferry, N.Y., assignor to Geigy Chemical Corporation, Greenburgh, N.Y., a corporation of New York
No Drawing. Continuation-in-part of abandoned application Ser. No. 551,218, May 19, 1966. This application Dec. 16, 1968, Ser. No. 784,208
Int. Cl. C07d 39/00
U.S. Cl. 260—294.7   6 Claims

ABSTRACT OF THE DISCLOSURE

Resolution of the four isomeric forms of 3-methyl-6,11 - diethyl - 1,2,3,4,5,6 - hexahydro - 2,6 - methano-3-benzazocine-8-ol is avoided through separation of racemic 3,4-diethyl-2-(p-methoxybenzyl) - 1 - methyl-1,2,5,6-tetrahydropyridine into its isomers and cyclizing only one isomer, with optional recycling of the other, so as to yield a readily separable product consisting of only two isomers, both of which are diastereoisomers.

Cross reference

This is a continuation-in-part of copending application Ser. No. 551,218, filed May 19, 1966, and now abandoned.

Detailed description

The present invention pertains to an improved process for the preparation of the optically active isomers of the known 3 - methyl-6,11-diethyl-1,2,3,4,5,6-hexahydro-2,6-methano-3-benzazocine-8-ol. This compound possesses two points of asymmetry, namely carbon atoms designated as 6 and 11. Four separate isomers are thus possible. The ethyl group in the 11-position may be oriented either cis or trans to the ethyl group in the 6-position, the cis configuration generally being designated the $\alpha$-isomer and the trans the $\beta$-isomer. For each of these, both dextrorotatory and levorotatory forms are possible. While the levorotatory forms of both the $\alpha$ and $\beta$ isomers are of interest pharmacologically, their analgesic and physical dependence profiles are different. Moreover the corresponding dextrorotatory forms of both the $\alpha$ and $\beta$ isomers are of considerable less interest. The synthetic methods previously employed have generated all isomers and while some progress has been made in controlling the relative formation of $\alpha$ and $\beta$ isomers through the use of different cyclizing agents [see, for example, Agar et al., J. Org. Chem., 28, 2470 (1963)], painstaking resolution of the relatively expensive product is still necessary.

The present invention overcomes many of these problems by directly generating in the cyclization a diastereoisomeric mixture from which the individual isomeric entities are readily separable. As will be apparent, while this may be either dextrorotatory or levorotatory isomers of either the $\alpha$ or $\beta$ form, the present description is directed at the levorotatory forms in view of their greater pharmacological interest.

According to this process the racemate of 1-methyl-2-(p - methoxybenzyl)-3,4-diethyl-1,2,5,6-tetrahydropyridine is treated with an optically active acid to form a diastereometric mixture of optically active salts and the salt of the levorotatory base with the optically active acid is then separated from the salt of the dextrorotatory base. Illustrative of useful optically active acids are, for example, tartaric acid, mandelic acid, camphor-sulfonic acid, malic acid, bromcamphor sulfonic acid and the like.

Especially useful is levorotatory or (−)-tartaric acid, which is the so-called unnatural form having the dextro absolute configuration. It has been found that formation of salts with levorotatory tartaric acid is a particularly useful means of separating the racemic tetrahydropyridine. For example, $d,l$-3,4-diethyl - 2 - (p-methoxybenzyl)-1-methyl-1,2,5,6-tetrahydropyridine and (−)-tartaric acid form a mixture of acid addition salts comprising the dextrorotatory-(+)-1,2,5,6-tetrahydropyridine (−)-tartrate and the levorotatory-(−)-1,2,5,6-tetrahydropyridine (−)-tartrate. The (−)-tartrate of the levorotatory substituted tetrahydropyridine is separable from the salt of the dextrorotatory isomer by taking advantage of the lower solubility of the former. The levorotatory substituted tetrahydropyridine (−)-tartrate crystallizes first from the solution of a mixture of salts.

Having separated the two salts, the optically active substituted tetrahydropyridine base is recovered by rendering a solution of the salt basic, for instance by treating it with ammonia or sodium carbonate, and removing the basic tetrahydropyridine which separates.

The optically active 1,2,5,6 - tetrahydropyridine of Formula II, not employed in the following procedure can be racemized and re-resolved in accordance with the procedure described above. The demand for the levorotatory isomers of the final benzazocines exceeds that for the dextrorotatory isomers as described above. As will be seen hereafter, the dextrorotatory 1,2,5,6-tetrahydropyridine is not used in the preparation of the levorotatory benzazocine. It is possible to racemize this accumulated dextrorotatory tetrahydropyridine, for example, by treatment with strong alkali such as potassium hydroxide and thus recycle the racemate in the initial resolution.

The optically active substituted 1,2,5,6-tetrahydropyridine which is retained is next treated, as its free base or as an acid addition salt thereof, with hydrobromic acid until cyclization is substantially complete and the optically active benzazocines thus formed is then recovered. The cyclization is generally executed at elevated temperatures, such as at the reflux temperature of the reaction mixture. Generally an excess of the hydrobromic acid is utilized as the cyclization medium. It is advantageous in obtaining highest yields to pass hydrogen bromide gas into the refluxing reaction medium, at least for part of the reaction time.

In this cyclization, the use of the levorotatory tetrahydropyridine, or an acid addition salt thereof, results in the exclusive formation of both the levorotatory isomers of both the $\alpha$ and $\beta$ benzazocines. These two levorotatory forms however are diastereoisomers and thus are readily separated by virtue of their different physical characteristics. Similarly use of the dextrorotatory tetrahydropyridine or an acid addition salt thereof, results in the exclusive formation of the dextrorotatory isomers of $\alpha$ and $\beta$ benzazocines which again are diastereoisomers and readily separable.

Thus the present process avoids the usual resolution of the mixture of isomeric benzazocines but instead generates in the synthesis a mixture of only two diastereoisomers which, under the proper selection of conditions, spontaneously separate from one another.

The following examples will serve to further typify the nature of this invention but should not be construed as a limitation in the scope thereof.

EXAMPLE (a) Resolution of 1-methyl-2-(p-methoxybenzyl)-3,4-diethyl-1,2,5,6-tetrahydropyridine $d,l$-1-methyl-2-(p-methoxybenzyl) - 3,4-diethyl-1,2,5,6-tetrahydropyridine (Fry and May, U.S. 3,093,650, Example B4, 8.74 g., 0.03 moles) and 4.50 g. of levorotatory (−)-tartaric acid are dissolved in a mixture of 70 ml. of acetone and 20 ml. of methanol. After filtering off a small amount of insoluble material the solution is concentrated to a volume of 40 ml. and cooled. The tartrate precipitates in the form of a thick slurry and 15 ml. of acetone is added to aid in filtering the product. After drying, the crude product weighs 5.5 g., 90% yield, M.P. 143–145° C. One recrystallization from isopropanol affords pure product, M.P. 145–148° C., $[\alpha]_D^{20} = -87.8° \pm 0.6$ MeOH, $l=1$, $C=3$

*Analysis.*—Calcd. (percent): C, 62.39; H, 7.85. Found: (percent): C, 62.41; H, 7.63.

(b) Cyclization to 1-3-methyl-6,11-diethyl-1,2,3,4,5,6-hexahydro-2,6-methano-3-benzazocine-8-ol

*l*-3,4-diethyl-2-(p-methoxybenzyl) - 1 - methyl-1,2,5,6-tetrahydropyridine, 49.1 g., in free base form, is refluxed with 500 ml. of 48% hydrobromic acid for 24 hours, a stream of hydrogenbromide gas being introduced for approximately 8 hours during the period of refluxing. The solution then is quenched with an ice water-ammonium hydroxide mixture and the mixture is extracted with chloroform. The chloroform layer is separated and, after evaporation of the solvent, 38.0 g. of residue remains. Vapor phase chromatography indicates the residue to comprise approximately 4 parts of *l*-3-methyl-6,11α-diethyl-1,2,3,4,5,6 - hexahydro-2,6-methano-3-benzazocine-8-ol and 1 part of *l*-3-methyl-6,11β-diethyl-1,2,3,4,5,6-hexahydro-2,6-methano-3-benzazocine-8-ol.

(c) Separation of isomers

The α-isomer is separated by refluxing the product of part (b) in 500 ml. of ether and filtering the ether while still warm, M.P. 214–217° C. $[\alpha]_D^{20} = -61°$, methanol, $C=1.5$. Ethyl acetate may also be employed in place of ether.

The insoluble material obtained upon the above filtration is dissolved in ethyl acetate and upon cooling an additional crop of α-isomer is recovered. The material in the mother liquor is mainly crude β-isomer and upon concentration to dryness the residue has a melting point of 180–187° C. The β-isomer is purified by carrying out a series of slow recrystallizations from benzene until a M.P. of 187–190° C. is obtained. $[\alpha]_D^{20} = -56.8°$, methanol, $C=2.5$.

What is claimed is:

1. The process which comprises (a) treating racemic 1-methyl-2-(p-methoxybenzyl) - 3,4-diethyl-1,2,5,6-tetrahydropyridine with an optically active acid and separating the salt of the levorotatory isomer and the salt of the dextrorotatory isomer thus formed, (b) subjecting one of the isomeric tetrahydropyridines, as its free base or as an acid addition salt, to the action of hydrobromic acid so as to form a diastereoisomeric mixture of 3-methyl-6,11α-diethyl-1,2,3,4,5,6-hexahydro - 2,6-methano-3-benzazocine-8-ol and 3-methyl-6,11β-diethyl-1,2,3,4,5,6-hexahydro-2,6-methano-3-benzazocine-8-ol and (c) separating said mixture into its diastereoisomers, each of said diastereoisomers having an optical rotation of the same sign as said isomeric tetrahydropyridine.

2. The process according to claim 1 wherein the levorotatory isomer of 1-methyl-2-(p-methoxybenzyl)-3,4-diethyl-1,2,5,6-tetrahydropyridine or an acid addition salt thereof is subjected to the action of hydrobromic acid, the diastereoisomer mixture thus formed being separated into levorotatory 3-methyl-6,11α-diethyl-1,2,3,4,5,6-hexahydro-2,6-methano-3-benzazocine-8-ol and levorotatory 3 - methyl - 6,11β - diethyl - 1,2,3,4,5,6 - hexahydro 2,6-methano-3-benzazocine-8-ol.

3. The process of claim 2 wherein the levorotatory isomer of 3-methyl-6,11β-diethyl-1,2,3,4,5,6-hexahydro-2,6-methano-3-benzazocine-8-ol is separated so as to be substantially free of the corresponding levorotatory α-isomer.

4. The process of claim 2 wherein the levorotatory isomer of 3-methyl-6,11α-diethyl-1,2,3,4,5,6-hexahydro-2,6-methano-3-benzazocine-8-ol is separated so as to be substantially free of the corresponding levorotatory β-isomer.

5. The process according to claim 2 wherein the levorotatory isomer of 1-methyl-2-(p-methoxybenzyl)-3,4-diethyl-1,2,5,6-tetrahydropyridine is obtained from its racemate through the use of levorotatory tartaric acid.

6. The process according to claim 5 wherein the residual dextrorotatory tetrahydropyridine is racemized and recycled.

References Cited

UNITED STATES PATENTS 3,417,094   12/1968   Dexter _____ 260—294.7

OTHER REFERENCES

Roberts et al., Basic Principles of Organic Chemistry, Benjamin, pp. 597–98, 1st ed. 1964, with subsequent reprints in 1965.

J. Org. Chem., vol. 27, 1962, pp. 245–247, Ager et al.

Chemical Abstracts, vol. 63, 1965, p. 4260g, Parke et al.

HENRY R. JILES, Primary Examiner

S. D. WINTERS, Assistant Examiner

U.S. Cl. X.R.

260—297